United States Patent
Yi et al.

(10) Patent No.: US 10,402,999 B2
(45) Date of Patent: Sep. 3, 2019

(54) METHOD, APPARATUS AND TERMINAL DEVICE FOR CONSTRUCTING MAP

(71) Applicant: Baidu Online Network Technology (Beijing) Co., Ltd., Beijing (CN)

(72) Inventors: Shichun Yi, Beijing (CN); Cheng Wang, Beijing (CN); Li Yu, Beijing (CN); Shiyu Song, Beijing (CN); Fangfang Dong, Beijing (CN)

(73) Assignee: BAIDU ONLINE NETWORK TECHNOLOGY (BEIJING) Co., LTD, Beijing ( * ) Notice: Subject to any disclaimer, the term of this patent is extended or adjusted under 35 U.S.C. 154(b) by 27 days.

(21) Appl. No.: 15/724,945

(22) Filed: Oct. 4, 2017

(65) Prior Publication Data

US 2019/0026920 A1   Jan. 24, 2019

(30) Foreign Application Priority Data

Jul. 21, 2017  (CN) .......................... 2017 1 0599794

(51) Int. Cl.
*G06T 7/73* (2017.01)
*G06K 9/00* (2006.01)
(Continued)

(52) U.S. Cl.
CPC .............. *G06T 7/74* (2017.01); *G01C 21/32* (2013.01); *G05D 1/0274* (2013.01);
(Continued)

(58) Field of Classification Search
CPC .............. G06K 9/0063; G06K 9/4604; G06K 2209/05; G06K 9/00597; G06K 9/00201; G06K 9/00214; G06K 9/46; G06K 9/629; G06K 9/0061; G06K 9/6212; G06K 9/6269; G06K 9/481; G06K 9/00362; G06K 9/00832; G06K 9/6252; G06K 9/6202;
(Continued)

(56) References Cited

U.S. PATENT DOCUMENTS 7,505,841 B2 *  3/2009  Sun .................... G06K 9/00362
                                                        345/419
8,340,400 B2 * 12/2012  Lukas ................ G06K 9/00201
                                                        382/154
(Continued)

FOREIGN PATENT DOCUMENTS

CN            106503248 A        3/2017

*Primary Examiner* — Aklilu K Woldemariam
(74) *Attorney, Agent, or Firm* — Knobbe Martens Olson & Bear LLP (57) ABSTRACT

The present disclosure discloses a method, apparatus and server for constructing a map. An embodiment of the method comprises: building a point cloud data frame sequence using point cloud data frames acquired in real time; extracting morphological data from the point cloud data frames; establishing a spatial position relation between the morphological data of two adjacent point cloud data frames in the point cloud data frame sequence; determining a reference spatial position relation corresponding to a stationary object based on the spatial position relation, and constructing a map with the reference spatial position relation. The present embodiment realizes constructing a map with the point cloud data.

15 Claims, 5 Drawing Sheets

(51) Int. Cl.
*G06K 9/46* (2006.01)
*G06T 7/246* (2017.01)
*G01C 21/32* (2006.01)
*G05D 1/02* (2006.01)
*G06T 17/05* (2011.01)
*G05D 1/00* (2006.01)

(52) U.S. Cl.
CPC ....... *G06K 9/00818* (2013.01); *G06K 9/4604* (2013.01); *G06T 7/248* (2017.01); *G06T 17/05* (2013.01); *G05D 1/0088* (2013.01); *G05D 2201/0213* (2013.01); *G06T 2207/10028* (2013.01); *G06T 2207/20036* (2013.01); *G06T 2207/30252* (2013.01)

(58) Field of Classification Search
CPC ......... G06K 2009/6213; G06K 9/6253; G06K 9/6267; G06T 2207/20036; G06T 7/0014; G06T 17/00; G06T 15/20; G06T 17/10; G06T 7/33; G06T 7/60; G06T 3/40; G06T 2207/20081; G06T 7/001; G06T 19/20; G06T 11/003; G06T 15/08; G06T 2207/10076; G06T 2207/10084; G06T 2207/10088; G06T 2207/10116; G06T 2207/10136; G06T 2207/30004; G06T 2207/30068; G06T 7/0012; G06T 7/0016; G06T 7/40; G06T 7/62; G06T 2210/56; G06T 7/0002; G06T 7/75; G06F 17/30247; G06F 19/00; G06F 17/30241; G06F 17/3028; H04N 13/25; H04N 13/282; G21F 9/004; G01B 5/0035; G01S 17/89

USPC ........ 382/103, 118, 128, 159; 348/234, 118, 348/89
See application file for complete search history.

(56) References Cited

U.S. PATENT DOCUMENTS

| | | | | |
|---|---|---|---|---|
| 9,008,366 | B1* | 4/2015 | Kim | G06K 9/6202 |
| | | | | 382/103 |
| 9,183,459 | B1* | 11/2015 | Zhang | G06K 9/52 |
| 9,286,538 | B1* | 3/2016 | Chen | G06K 9/00208 |
| 9,633,483 | B1* | 4/2017 | Xu | G06T 17/10 |
| 2002/0176069 | A1* | 11/2002 | Hansen | G01N 15/147 |
| | | | | 356/73 |
| 2005/0013486 | A1* | 1/2005 | Wiedemann | G06K 9/0063 |
| | | | | 382/181 |
| 2005/0152588 | A1* | 7/2005 | Yoshida | G06T 7/0012 |
| | | | | 382/128 |
| 2008/0063238 | A1* | 3/2008 | Wiedemann | G06K 9/0063 |
| | | | | 382/103 |
| 2010/0284572 | A1* | 11/2010 | Lukas | G06K 9/00201 |
| | | | | 382/107 |
| 2011/0135148 | A1* | 6/2011 | Hsiao | G06K 9/00355 |
| | | | | 382/103 |
| 2012/0189176 | A1* | 7/2012 | Giger | G06K 9/6253 |
| | | | | 382/128 |
| 2014/0064580 | A1* | 3/2014 | Madabhushi | G06T 7/0012 |
| | | | | 382/128 |
| 2014/0293091 | A1* | 10/2014 | Rhoads | G01J 3/513 |
| | | | | 348/234 |
| 2015/0071528 | A1* | 3/2015 | Marchisio | G06F 16/29 |
| | | | | 382/159 |

* cited by examiner

ME THOD, APPARATUS AND TERMINAL DEVICE FOR CONSTRUCTING MAP

CROSS-REFERENCE TO RELATED APPLICATION

This application is related to and claims the priority from Chinese Application No. 201710599794.1, filed on Jul. 21, 2017, entitled "Method, Apparatus and Terminal Device for Constructing Map," the entire disclosure of which is incorporated herein by reference.

TECHNICAL FIELD

The present disclosure relates to the field of data processing technology, specifically to the field of image drawing technology, and more specifically to a method, apparatus and terminal device for constructing a map.

BACKGROUND

Vehicles expand people's travelling range, bring convenience to people's travelling, and improve people's quality of life. With the development and progress in science and technology, an unmanned vehicle controlled by an intelligent system can acquire more driving information than a manned vehicle, possessing higher security, and has become an important trend in the future vehicle development. The unmanned vehicle adopts a robot operating system for information transmission, and relies on cooperation between the artificial intelligence, visual computing, video cameras, radar sensors, navigation systems and other entities, such that the unmanned vehicle can travel automatically and safely without any assistance.

There are still some shortcomings with respect to the autonomous driving of the existing unmanned vehicle. For example, the unmanned vehicle needs to rely on a navigation system to determine its current location, and generates a corresponding controlling command based on the current location, thereby achieving autonomous driving. However, since tunnels, bridges or other buildings often affect the navigation signal, even making the navigation signal unavailable to the navigation system, it results in that the unmanned vehicle cannot acquire the map information of the current location and is unable to estimate the driving environment, thus affecting the normal driving of the unmanned vehicle.

SUMMARY

The objective of embodiments of the present disclosure is to provide a method, apparatus and terminal device for constructing a map, in order to solve the technical problem mentioned in the foregoing Background section.

In a first aspect, embodiments of the present disclosure provides a method for constructing a map, comprising: building a point cloud data frame sequence using point cloud data frames acquired in real time, the point cloud data frame sequence including a plurality of point cloud data frames arranged in an order of acquisition time, adjacent point cloud data frames being generated after a set time, the point cloud data frames including point cloud data arranged in a matrix, the point cloud data including three-dimensional coordinates of a spatial position for marking an object; extracting morphological data from the point cloud data frames, the morphological data used for characterizing a morphological feature of a surface of the object and a morphological feature of a line of the object, including surface point cloud data corresponding to the surface of the object and/or line point cloud data corresponding to the line of the object; establishing a spatial position relation between morphological data of two adjacent point cloud data frames in the point cloud data frame sequence; and determining a reference spatial position relation corresponding to a stationary object based on the spatial position relation, and constructing a map with the reference spatial position relation.

In some embodiments, the extracting morphological data from the point cloud data frames comprises: determining a plurality of vectors between each point cloud data and an adjacent point cloud data in the point cloud data frames; and assigning, when a vector satisfies a distance threshold condition and an angle threshold condition, two point cloud data corresponding to the vector as the morphological data.

In some embodiments, the establishing a spatial position relation between morphological data of two adjacent point cloud data frames in the point cloud data frame sequence comprises: determining two sets of morphological data corresponding to a given object in the two adjacent point cloud data frames; and calculating a distance and an angle between the two sets of morphological data to obtain a spatial position relation.

In some embodiments, the determining a reference spatial position relation corresponding to a stationary object based on the spatial position relation comprises: counting a velocity of each object in the two adjacent point cloud data frames to obtain a velocity profile, the velocity being determined by the spatial position relation and the set time; and determining an object corresponding to the velocity having a largest ratio from the velocity profile as a stationary object, and determining a spatial position relation of the stationary object as a reference spatial position relation.

In some embodiments, the constructing a map with the reference spatial position relation comprises: plotting the stationary object in the world coordinate system based on morphological data corresponding to the reference spatial position relation to obtain a map corresponding to the point cloud data frame sequence.

In a second aspect, embodiments of the present disclosure provides an apparatus for constructing a map, comprising: a point cloud data frame sequence building unit, configured to build a point cloud data frame sequence using point cloud data frames acquired in real time, the point cloud data frame sequence including a plurality of point cloud data frames arranged in an order of acquisition time, adjacent point cloud data frames being generated after a set time, the point cloud data frames including point cloud data arranged in a matrix, the point cloud data including three-dimensional coordinates of a spatial position for marking an object; a morphological data extracting unit, configured to extract morphological data from the point cloud data frames, the morphological data used for characterizing a morphological feature of a surface of the object and a morphological feature of a line of the object, including surface point cloud data corresponding to the surface of the object and/or line point cloud data corresponding to the line of the object; a spatial position relation establishing unit, configured to establish a spatial position relation between morphological data of two adjacent point cloud data frames in the point cloud data frame sequence; and a map constructing unit, configured to determine a reference spatial position relation corresponding to a stationary object based on the spatial position relation, and construct a map with the reference spatial position relation.

In some embodiments, the morphological data extracting unit comprises: a vector building subunit, configured to determine a plurality of vectors between each point cloud data and an adjacent point cloud data in the point cloud data frames; and a morphological data determining subunit, configured to assign, when a vector satisfies a distance threshold condition and an angle threshold condition, two point cloud data corresponding to the vector as the morphological data.

In some embodiments, the spatial position relation establishing unit comprises: a morphological data determining subunit, configured to determine two sets of morphological data corresponding to a given object in the two adjacent point cloud data frames; and a spatial position relation acquisition subunit, configured to calculate a distance and an angle between the two sets of morphological data to obtain a spatial position relation.

In some embodiments, the map constructing unit comprises: a velocity profile building subunit, configured to count a velocity of each object in the two adjacent point cloud data frames to obtain a velocity profile, the velocity being determined by the spatial position relation and the set time; and a reference spatial position relation determining subunit, configured to determine an object corresponding to the velocity having a largest ratio from the velocity profile as a stationary object, and determine a spatial position relation of the stationary object as a reference spatial position relation.

In some embodiments, the map constructing unit further comprises: plot the stationary object in the world coordinate system based on morphological data corresponding to the reference spatial position relation to obtain a map corresponding to the point cloud data frame sequence.

In a third aspect, embodiments of the present disclosure provides a terminal device, comprising: one or more processors; a storage to store one or more programs; a laser radar to collect point cloud data; and the one or more programs, when executed by the one or more processors, cause the one or more processors to perform a method for constructing a map of the first aspect.

In a fourth aspect, embodiments of the present disclosure provides a computer readable storage medium storing a computer program thereon, the program, when executed by a processor, performs a method for constructing a map of the first aspect.

The method, apparatus and terminal device for constructing a map provided by embodiments of the present disclosure extracts morphological data from the point cloud data frames and further obtains a spatial position relation between morphological data of two adjacent point cloud data frames, then determines the stationary object based on the spatial position relation, and builds the map based on the point cloud data corresponding to the reference spatial position relation of the stationary object.

BRIEF DESCRIPTION OF THE DRAWINGS

After reading detailed descriptions of non-limiting embodiments with reference to the following accompanying drawings, other features, objectives and advantages of the present disclosure will be more apparent.

DETAILED DESCRIPTION OF EMBODIMENTS

The present application will be further described below in detail in combination with the accompanying drawings and the embodiments. It should be appreciated that the embodiments described herein are merely used for explaining embodiments of the disclosure, rather than limiting the disclosure. In addition, it should be noted that, for the ease of description, only the parts related to the relevant embodiments are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
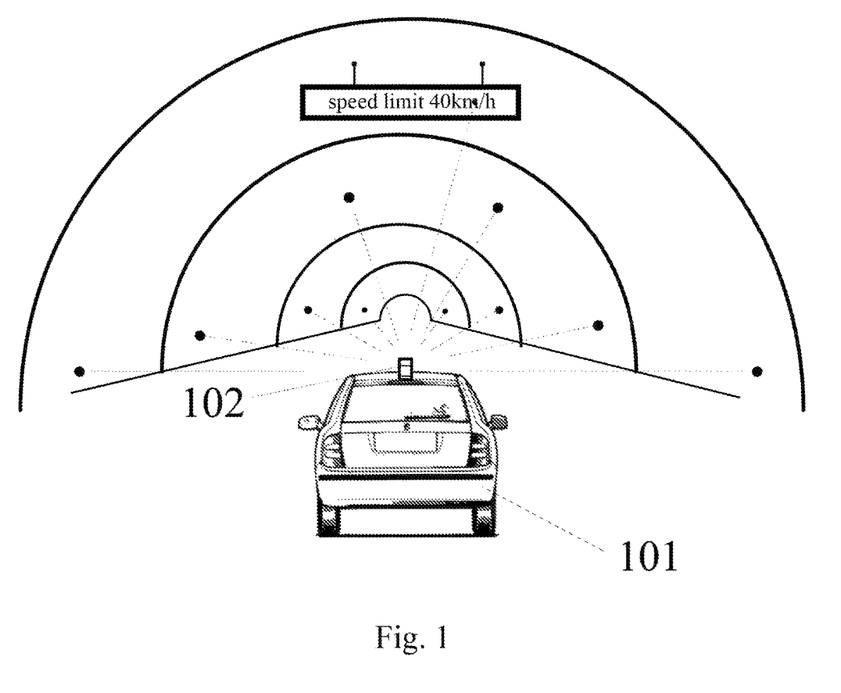
FIG. 1 is an exemplary system architecture diagram in which the present disclosure may be applied.

FIG. 1 shows an exemplary architecture of a system 100 which may be used by a method and apparatus for constructing a map according to an embodiment of the present application.

As shown in FIG. 1, the system architecture 100 may include an unmanned vehicle 101 and a point cloud data collecting apparatus 102 located on the unmanned vehicle 101.

The point cloud data collecting apparatus 102 may periodically acquire point cloud data corresponding to the surrounding environment of the unmanned vehicle 101. The point cloud data includes three-dimensional coordinates of objects in the surrounding environment of the unmanned vehicle 101.

The unmanned vehicle 101 may be installed with a data processing apparatus, such as a distance sensor, a display, a processor and other devices.

The unmanned vehicle 101 may receive point cloud data collected by the point cloud data collecting apparatus 102, determine locations of the objects surrounding the unmanned vehicle 101 based on the point cloud data, plot diagrams of the objects surrounding the unmanned vehicle 101, and construct a map of the surrounding of the unmanned vehicle 101 based on the locations and the diagrams of the surrounding objects.

It needs to be noted that the method for constructing a map provided by embodiments of the present disclosure is typically performed by the unmanned vehicle 101, and accordingly, the apparatus for constructing a map is typically provided in the unmanned vehicle 101.

Figure 2:
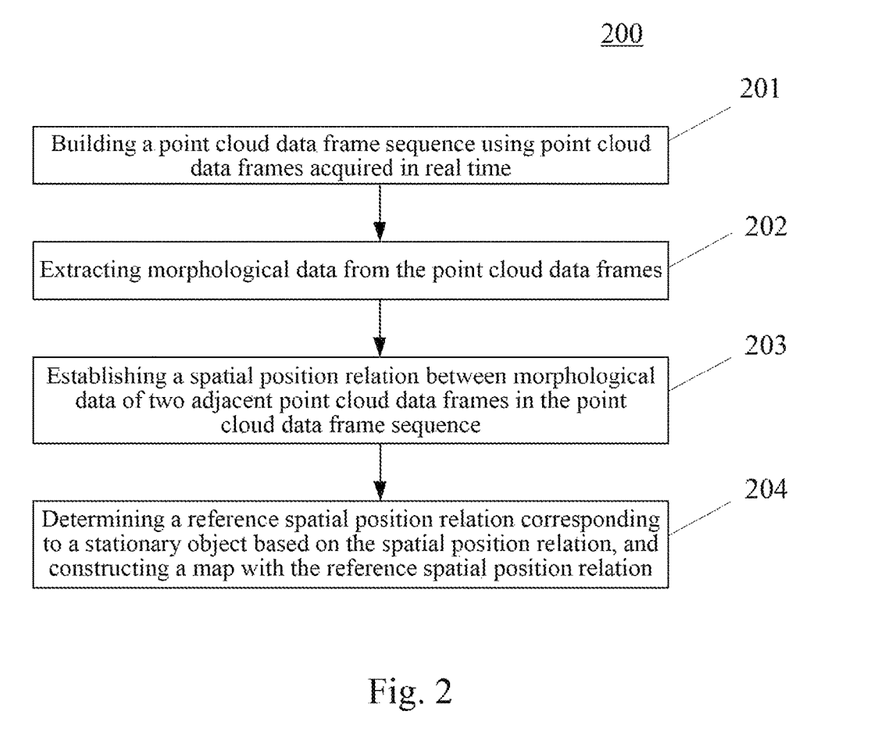
FIG. 2 is a flowchart of an embodiment of a method for constructing a map according to the present disclosure.

With further reference to FIG. 2, a flow 200 of an embodiment of the method for constructing a map according to the present disclosure is illustrated. The method for constructing a map includes the following steps:

Step 201, building a point cloud data frame sequence using point cloud data frames acquired in real time.

In the present embodiment, a device (e.g., the unmanned vehicle 101 as illustrated in FIG. 1) on which the method for constructing a map operate may acquire, by means of wired connection or wireless connection, point cloud data frames from the point cloud data collecting apparatus 102, wherein the point cloud data frame sequence includes a plurality of point cloud data frames arranged in an order of acquisition time, adjacent point cloud data frames are generated after a set time, the point cloud data frames include point cloud data arranged in a matrix, and the point cloud data includes three-dimensional coordinates of a spatial position for marking an object. It needs to be noted that the wireless connection may include, but is not limited to, 3G/4G connection, WiFi connection, bluetooth connection, WiMAX connection, Zigbee connection, UWB (ultra wideband) connection, and other wireless connections known by now or to be developed in the future.

The unmanned vehicle 101 is installed with the point cloud data collecting apparatus 102. The point cloud data collecting apparatus 102 may be a laser radar. When the unmanned vehicle 101 is unable to recognize the surrounding environment through the navigation system, the point cloud data frames of the surrounding environment may be collected by the point cloud data collecting apparatus 102. The point cloud data collecting apparatus 102 may acquire the point cloud data frame by transmitting uniformly distributed collection signals to the space and receiving the feedback signals. The point cloud data frames include point cloud data arranged in a matrix, and each point cloud data corresponds to a three-dimensional coordinate representing a location in the space of a certain point on an object surrounding the unmanned vehicle 101. The origin of the three-dimensional coordinate system corresponding to the three-dimensional coordinates may be set as the location of the unmanned vehicle 101 when the point cloud data collecting apparatus 102 starts to acquire the point cloud data, the current driving direction of the unmanned vehicle 101 may be set as the X axis or the Y axis of the three-dimensional coordinate system, or the actual direction (e.g., the due east, the due south, the due west or the due north) may be set as the X axis or Y axis of the three-dimensional coordinate system, here, detailed description thereof will be omitted. In addition, the point cloud data may also include color information, etc., depending on the actual needs.

The unmanned vehicle 101 may perform data processing to the point cloud data frame to obtain a map built with the point cloud data. Specifically, the point cloud data collecting apparatus 102 may periodically collect the point cloud data of the objects within a certain distance range and/or angle range of the unmanned vehicle 101 by laser scanning or other means, with the unmanned vehicle 101 being the center of a circle. A point cloud data frame is obtained in each period, and the time length of the period may be set to be a set time, so that the interval between the generation times of two adjacent frames of point cloud data frames is the set time (one period). At the same time, the distance range and/or the angle range may be set according to actual needs. Typically, the distance range is set to meet the autonomous driving requirements of the unmanned vehicle 101, and the angle range is set to meet the needs of constructing a map. Typically, the horizontal rotation angle (i.e., the rotation angle in the horizontal direction) of the point cloud data collecting apparatus 102 is 360°, and the scanning angle (i.e., the scanning angle in the vertical direction) is between 0 and 180°. Optionally, the angle range is a space hemisphere with the unmanned vehicle 101 as the center of a circle.

The point cloud data frame may be transmitted to the unmanned vehicle 101 in real time after being acquired by the point cloud data collecting apparatus 102. After the unmanned vehicle 101 acquires the point cloud data frames in real time, the point cloud data frames may be arranged in the order of acquisition time to further obtain the point cloud data frame sequence.

Step 202, extracting morphological data from the point cloud data frames.

In the present embodiment, the morphological data is used to characterize the morphological feature of the surface of the object and the morphological feature of the line of the object, including surface point cloud data corresponding to the surface of the object and/or line point cloud data corresponding to the line of the object. For example, the point cloud data collected by the point cloud data collecting apparatus 102 includes a speed limit sign near the unmanned vehicle 101. The speed limit sign consists of a circular display board with speed-limit information and a pillar, and the pillar is fixed to the ground. In the point cloud data, the circular display board is equivalent to the surface, the pillar is equivalent to the line, and the speed limit sign is then represented as surface point cloud data corresponding to the circular display board and line point cloud data corresponding to the pillar in the point cloud data. Similarly, the outer surface of each object may be described by the surface point cloud data corresponding to the "surface" and line point cloud data corresponding to the "line."

In some alternative implementations of the present embodiment, the extracting morphological data from the point cloud data frames may include the following steps:

The first step, determining a plurality of vectors between each point cloud data and an adjacent point cloud data in the point cloud data frames.

Since each point cloud data corresponds to a three-dimensional coordinate, and the point cloud data is arranged in a matrix in the point cloud data frames, a vector may be constituted by any point cloud data as the origin and an adjacent point cloud data as the end point. Each point cloud data may constitute 8 vectors with the adjacent point cloud data at most, and may constitute three vectors at least.

The second step, assigning, when a vector satisfies a distance threshold condition and an angle threshold condition, two point cloud data corresponding to the vector as the morphological data.

As can be seen from the previous step, adjacent point cloud data may constitute a vector. Since each point cloud data represents a point on the surface of the object, the vector constituted by the adjacent point cloud data may be used to determine whether the two point cloud data corresponding to the vector belong to a same surface or line.

The more point cloud data in each point cloud data frame is collected by the point cloud data collecting apparatus 102, the more point cloud data is distributed on the surface of the object of the same size, and the surface of the object can be described more accurately.

Since the point cloud data collecting apparatus 102 acquires the point cloud data by transmitting the uniformly distributed collection signals to the space, the size of the vector constituted by the adjacent point cloud data belonging to the same surface or line (i.e., the spatial distance between the three-dimensional coordinates of the two point cloud data constituting the vector) is substantially the same to the spatial distance between the collection signals. When the size of the vector is greater than the distance threshold condition, it can be assumed that the two point cloud data corresponding to the vector are not on the same surface or the same line. On the contrary, the two point cloud data corresponding to the vector are on the same surface or the same line. The distance threshold condition is set based on the spatial distance between the collection signals, depending on the actual situation.

The angle threshold condition may be used to determine the direction of the sideline of the surface or the line, and also used to determine whether the two point cloud data corresponding to the vector belong to the same surface or line.

Specifically, the formula for determining whether the two point cloud data belong to the same surface or line is:

$$lc(x_i, x_j) = \begin{cases} \text{true} & \text{if} \begin{bmatrix} \begin{bmatrix} (\vec{n}_i \Box \vec{d}_{ij} \leq \|\vec{d}_{ij}\| \Box \cos(\frac{\pi}{2} - \varepsilon_1)) \cap \\ (-\vec{n}_j \Box \vec{d}_{ij} \leq \|-\vec{d}_{ij}\| \Box \cos(\frac{\pi}{2} - \varepsilon_1)) \end{bmatrix} \cup \\ [(\vec{n}_i \Box \vec{n}_j \geq 1 - \|\vec{d}_{ij}\| \Box \cos(\frac{\pi}{2} - \varepsilon_2))] \end{bmatrix} \\ \text{false} & \text{others} \end{cases}$$

Here, $lc(x_i, x_j)$ is the local convexity between the point cloud data $x_i$ and the point cloud data $x_j$, which is used to characterize the possibility that the point cloud data $x_i$ and the point cloud data $x_j$ belong to the same surface or line. $\vec{n}_i$ is the normal vector of the surface where the point cloud data $x_i$ is located. $\vec{n}_j$ is the normal vector of the surface where the point cloud data $x_j$ is located. $\vec{d}_{ij}$ is the vector constituted by pointing from the point cloud data $x_1$ to the point cloud data $x_j$. $\|\vec{d}_{ij}\|$ is the Euclidean distance of the vector $\vec{d}_{ij}$. $\varepsilon_1$ is the angle threshold when the point cloud data $x_i$ is in line with the local convexity. $\varepsilon_2$ is the angle threshold when the point cloud data $x_j$ is in line with the local convexity.

Here, whether the point cloud data belong to the same surface may be determined by the following formula:

$$\vec{n} \Box (\overrightarrow{x_c x}) = 0.$$

Here, $\vec{n}$ is the normal vector of a certain plane. $\overrightarrow{x_c x}$ is the vector constituted by the plane centroid $x_c$ on the plane corresponding to the normal vector $\vec{n}$ and a certain point cloud data x.

Step 203, establishing a spatial position relation between morphological data of two adjacent point cloud data frames in the point cloud data frame sequence.

Each point cloud data frame can acquire the point cloud data of the objects surrounding the unmanned vehicle 101 at a certain moment. When the unmanned vehicle 101 is in a motion state, the morphological data corresponding to the given object changes in the two adjacent point cloud data frames. Therefore, by establishing a correspondence relation between the morphological data of the given object in the two adjacent point cloud data frames, the spatial position relation between the morphological data of the object can be obtained. The spatial position relation may also reflect the current motion state of the unmanned vehicle 101.

In some alternative implementations of the present embodiment, the establishing a spatial position relation between morphological data of two adjacent point cloud data frames in the point cloud data frame sequence may include the following steps:

The first step, determining two sets of morphological data corresponding to a given object in the two adjacent point cloud data frames.

The surface of the object is described by a combination of the surface and the line, and each point cloud data frame may be determined with a corresponding surface and line. Thus, it may be determined by the correspondence relation between the surface and the line that whether the two sets of morphological data in the two adjacent point cloud data frames correspond to the given object.

The second step, calculating a distance and an angle between the two sets of morphological data to obtain a spatial position relation.

The morphological data is also point cloud data, and the point cloud data includes the three-dimensional coordinates. Through the three-dimensional coordinates corresponding to the two sets of morphological data of the given object, the distance (i.e., the Euclidean distance of the vector, and the vector may be constituted by two three-dimensional coordinates corresponding to the same point of the object in the two sets of morphological data, in addition, the three-dimensional coordinate from the morphological data acquired earlier in the two sets of morphological data points to the three-dimensional coordinate from the morphological data acquired latter. The vector may be constituted in other ways, detailed information thereof will be omitted) and the angle (since the three-dimensional coordinate system has been built before, it is also possible to obtain the angle corresponding to the vector) between the two three-dimensional coordinates may be obtained. The distance and the angle between the two sets of morphological data correspond to that the object points from the morphological data acquired earlier to the morphological data acquired latter after the set time interval. That is, with the set time interval, the spatial position relation of a certain object in the three-dimensional coordinate system.

Step 204, determining a reference spatial position relation corresponding to a stationary object based on the spatial position relation, and constructing a map with the reference spatial position relation.

In practice, the point cloud data collecting apparatus 102 may, during the driving of the unmanned vehicle 101, monitor point cloud data of the moving objects (e.g., other vehicles at different speeds and/or to different directions with the current unmanned vehicle 101, pedestrians, birds, etc.), and also may monitor point cloud data of the stationary objects (roadside buildings, speed limit signs, trees, etc.). But when constructing a map with the point cloud data, only the stationary objects may be used for building, otherwise the resulting map will be incorrect. Therefore, it may be determined based on the above spatial position relation that which of the morphological data corresponds to the moving objects, and which of the morphological data corresponds to the stationary objects. Then, the spatial position relation of the stationary object in the two adjacent point cloud data frames is used as the reference spatial position relation to construct the map.

In some alternative implementations of the present embodiment, the determining a reference spatial position relation corresponding to a stationary object based on the spatial position relation may include the following steps:

The first step, counting a velocity of each object in the two adjacent point cloud data frames to obtain a velocity profile.

Typically, the point cloud data frame has the point cloud data corresponding to a plurality of objects, and the velocity of an object in the set time interval may be obtained through the distance and the angle corresponding to the spatial position relation of the given object in the two adjacent point cloud data frames. Therefore, the velocity of each object in the two adjacent point cloud data frames may be counted, and a velocity profile may be further obtained. The velocity profile is used to determine which objects are stationary and which objects are moving. Here, the velocity is determined by the spatial position relation and the set time. The velocity profile is used to count the quantity information of the velocity within a certain range.

It should be noted that when the unmanned vehicle 101 is in a motion state, there may be point cloud data of different objects in the two adjacent point cloud data frames. For example, a first point cloud data frame scans the point cloud data of 50 objects, and a second point cloud data frame obtained after the set time interval scans the point cloud data of 50 (or other quantity) objects. In the point cloud data of the 50 objects obtained by the second point cloud data frame, there may be the point cloud data of an object that is monitored for the first time, at the same time, the point cloud data corresponding to the object in the first point cloud data frame may not be monitored. Therefore, the velocity profile is for the given object in the two adjacent point cloud data frames, and whether the two adjacent point cloud data frames can monitor the given object is related to the driving speed of the unmanned vehicle 101. The driving speed of the unmanned vehicle 101 may be determined depending on the actual needs.

The second step, determining an object corresponding to the velocity having the largest ratio from the velocity profile as a stationary object, and determining a spatial position relation of the stationary object as a reference spatial position relation.

The point cloud data collecting apparatus 102 may monitor the point cloud data of many objects at a time, but in practice, there are not many moving objects surrounding the unmanned vehicles 101. That is, through the two adjacent point cloud data frames, most of the obtained is the velocity of the stationary object. Therefore, it may be found out from the velocity profile the velocity having the largest ratio of the total velocity, and further determine the spatial position relation corresponding to the velocity having the largest ratio as the reference spatial position relation. For example, in the velocity profile, the objects with a speed of 40 km/h accounts for 90% of the total velocity and other velocity accounts for 10% of the total velocity, it can be assumed that the objects with the speed of 40 km/h are stationary objects.

In some alternative implementations of the present embodiment, the constructing a map with the reference spatial position relation may include: plotting the stationary object in the world coordinate system based on morphological data corresponding to the reference spatial position relation to obtain a map corresponding to the point cloud data frame sequence.

After determining the reference spatial position relation corresponding to the stationary object, the corresponding point cloud data in each point cloud data frame may be determined. As the point cloud data is three-dimensional coordinates, therefore, the corresponding stationary object may be plotted in the three-dimensional coordinate system with these three-dimensional coordinates, thereby obtaining the map corresponding to the point cloud data frame sequence. The three-dimensional coordinate system may be the world coordinate system.

Figure 3:
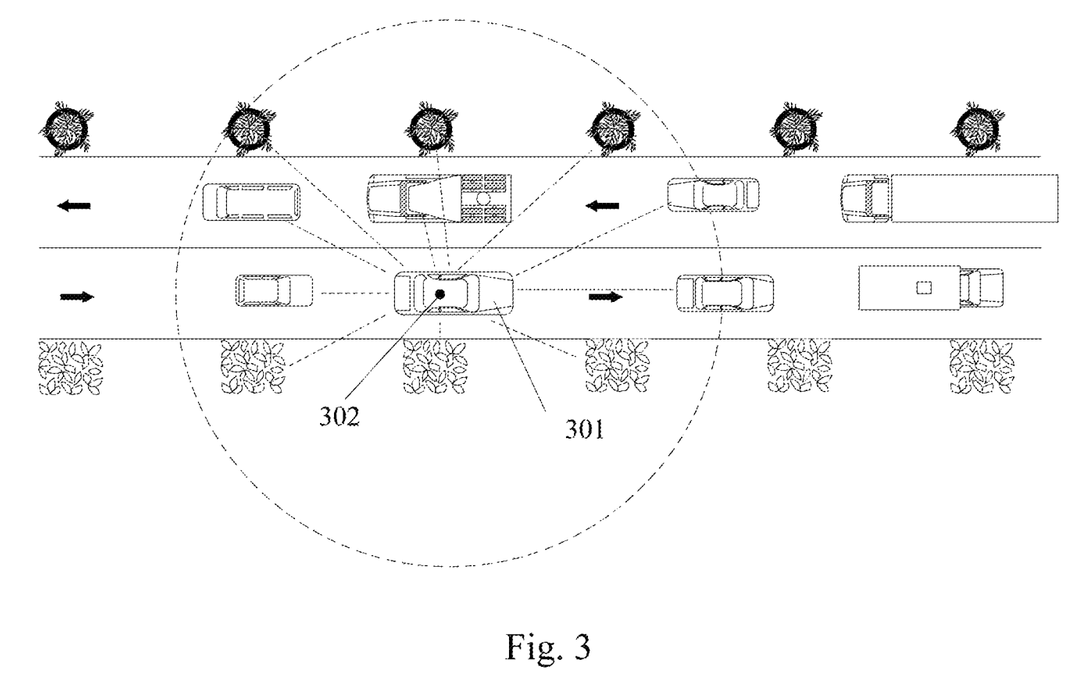
FIG. 3 is a schematic diagram of an application scenario of the method for constructing a map according to the present disclosure.

With further reference to FIG. 3, FIG. 3 is a schematic diagram of an application scenario of the method for constructing a map according to the present embodiment. In the application scenario of FIG. 3, the point cloud data collecting apparatus 302 installed on the unmanned vehicle 301 acquires the point cloud data of the objects surrounding the unmanned vehicle 301. In FIG. 3, the dashed circle is the monitoring range of the point cloud data collecting apparatus 302, and the dashed straight line is the objects monitored by the point cloud data collecting apparatus 302. The point cloud data collecting apparatus 302 acquires the point cloud data of the objects within each dashed circle and then obtains the point cloud data frame, and transmits the point cloud data frame to the data processing unit of the unmanned vehicle 301. The unmanned vehicle 301 acquires the point cloud data frame in real time and builds the point cloud data frame sequence. The data processing unit extracts the morphological data from the point cloud data frames, establishes the spatial position relation between the morphological data of the two adjacent point cloud data frames in the point cloud data frame sequence, finally determines the reference spatial position relation corresponding to the stationary object based on the spatial position relation, and achieves constructing of the map of the surrounding environment of the unmanned vehicles 301 based on the reference spatial position relation.

The method provided by the above embodiment of the present disclosure extracts morphological data from the point cloud data frames and further obtains a spatial position relation between morphological data of two adjacent point cloud data frames, then determines the stationary object based on the spatial position relation, and builds the map based on the reference spatial position relation of the stationary object.

Figure 4:
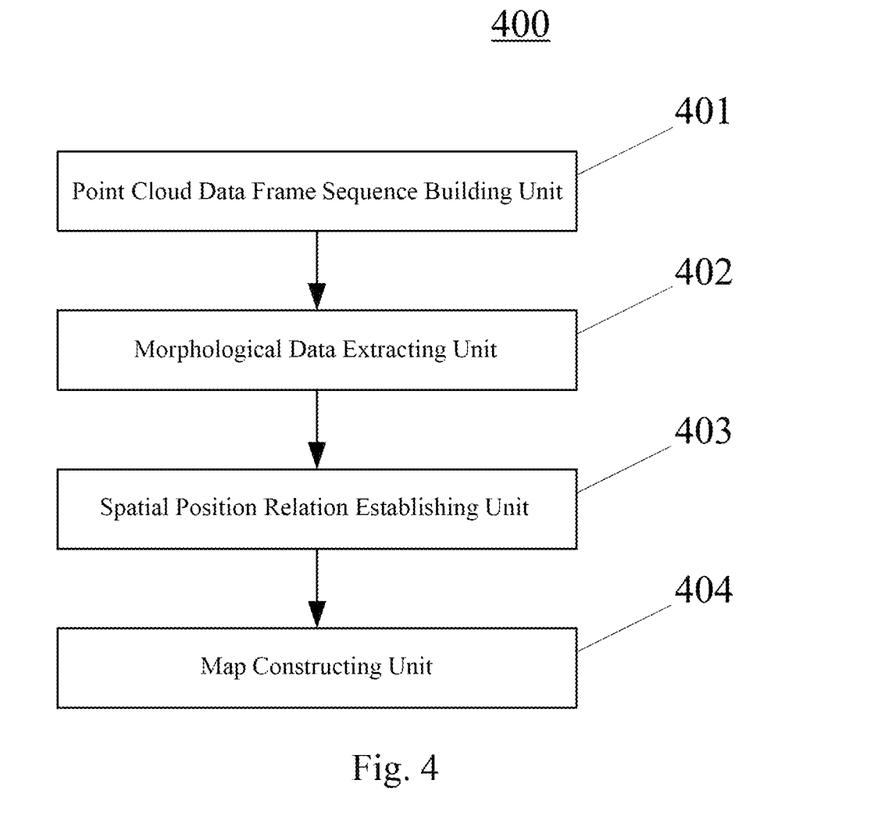
FIG. 4 is a schematic structural diagram of an embodiment of an apparatus for constructing a map according to the present disclosure.

With further reference to FIG. 4, as an implementation to the method shown in the above figures, the present disclosure provides an embodiment of an apparatus for constructing a map, the apparatus embodiment corresponds to the method embodiment shown in FIG. 2, and the apparatus may be specifically applied to various electronic devices.

As shown in FIG. 4, the apparatus 400 for constructing a map of the present embodiment may include: a point cloud data frame sequence building unit 401, a morphological data extracting unit 402, a spatial position relation establishing unit 403 and a map constructing unit 404. Here, the point cloud data frame sequence building unit 401 is configured to build a point cloud data frame sequence using point cloud data frames acquired in real time, the point cloud data frame sequence including a plurality of point cloud data frames arranged in an order of acquisition time, adjacent point cloud data frames being generated after a set time, the point cloud data frames including point cloud data arranged in a matrix, the point cloud data including three-dimensional coordinates of a spatial position for marking an object. The morphological data extracting unit 402 is configured to extract morphological data from the point cloud data frames, the morphological data used for characterizing a morphological feature of a surface of the object and a morphological feature of a line of the object, including surface point cloud data corresponding to the surface of the object and/or line point cloud data corresponding to the line of the object. The spatial position relation establishing unit 403 is configured to establish a spatial position relation between morphological data of two adjacent point cloud data frames in the point cloud data frame sequence. The map constructing unit 404 is configured to determine a reference spatial position relation corresponding to a stationary object based on the spatial position relation, and construct a map with the reference spatial position relation.

In some alternative implementations of the present embodiment, the morphological data extracting unit 402 may include: a vector building subunit (not shown in the figure) and a morphological data determining subunit (not shown in the figure). Here, the vector building subunit is configured to determine a plurality of vectors between each point cloud data and an adjacent point cloud data in the point cloud data frames. The morphological data assigning subunit is configured to assign, when a vector satisfies a distance threshold condition and an angle threshold condition, two point cloud data corresponding to the vector as the morphological data.

In some alternative implementations of the present embodiment, the spatial position relation establishing unit 403 may include: a morphological data determining subunit (not shown in the figure) and a spatial position relation acquisition subunit (not shown in the figure). Here, the morphological data determining subunit is configured to determine two sets of morphological data corresponding to a given object in the two adjacent point cloud data frames. The spatial position relation acquisition subunit is configured to calculate a distance and an angle between the two sets of morphological data to obtain a spatial position relation.

In some alternative implementations of the present embodiment, the map constructing unit 404 may include: a velocity profile building subunit (not shown in the figure) and a reference spatial position relation determining subunit (not shown in the figure). Here, the velocity profile building subunit is configured to count velocity of each object in the two adjacent point cloud data frames to obtain a velocity profile, the velocity being determined by the spatial position relation and the set time. The reference spatial position relation determining subunit is configured to determine an object corresponding to the velocity having the largest ratio from the velocity profile as a stationary object, and determine a spatial position relation of the stationary object as a reference spatial position relation.

In some alternative implementations of the present embodiment, the map constructing unit 404 may further include: plotting the stationary object in the world coordinate system based on morphological data corresponding to the reference spatial position relation to obtain a map corresponding to the point cloud data frame sequence.

The present embodiment further provides a server, including: one or more processors, a storage to store one or more programs and a laser radar to collect point cloud data. The one or more programs, when executed by the one or more processors, cause the one or more processors to perform the method for constructing a map.

The present embodiment further provides a computer readable storage medium storing a computer program thereon, the program, when executed by a processor, realizes the method for constructing a map.

Figure 5:
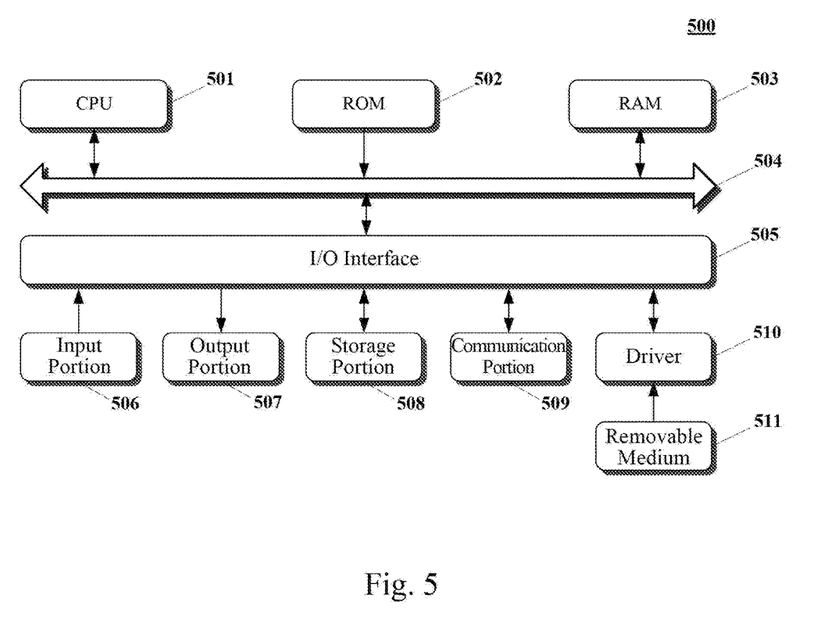
FIG. 5 is a schematic structural diagram of a computer system adapted to implement a terminal device or a server of the embodiments of the present disclosure.

Referring now to FIG. 5, a structural schematic diagram of a computer system 500 suitable for implementing the terminal device of embodiments of the present disclosure is shown. The terminal device shown in FIG. 5 is merely an example and should not impose any restriction on the function and the range of application of the embodiments of the present disclosure.

As shown in FIG. 5, the computer system 500 includes a central processing unit (CPU) 501, which may execute various appropriate actions and processes in accordance with a program stored in a read-only memory (ROM) 502 or a program loaded into a random access memory (RAM) 503 from a storage portion 508. The RAM 503 also stores various programs and data required by operations of the system 500. The CPU 501, the ROM 502 and the RAM 503 are connected to each other through a bus 504. An input/output (I/O) interface 505 is also connected to the bus 504.

The following components are connected to the I/O interface 505: an input portion 506 including a keyboard, a mouse etc.; an output portion 507 comprising a cathode ray tube (CRT), a liquid crystal display device (LCD), a speaker etc.; a storage portion 508 including a hard disk and the like; and a communication portion 509 comprising a network interface card, such as a LAN card and a modem. The communication portion 509 performs communication processes via a network, such as the Internet. A driver 510 is also connected to the I/O interface 505 as required. A removable medium 511, such as a magnetic disk, an optical disk, a magneto-optical disk, and a semiconductor memory, may be installed on the driver 510, to facilitate the retrieval of a computer program from the removable medium 511, and the installation thereof on the storage portion 508 as needed.

In particular, according to an embodiment of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 509, and/or may be installed from the removable media 511. The computer program, when executed by the central processing unit (CPU) 501, implements the above mentioned functionalities as defined by the methods of the present application.

It needs to be noted that the computer readable medium in the present disclosure may be computer readable signal medium or computer readable storage medium or a combination thereof. An example of the computer readable storage medium may include but not limited to: systems, apparatus or elements of electric, magnet, optical, electromagnet, infrared ray, or semiconductor or a combination thereof. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or a combination thereof. In the present disclosure, the computer readable storage medium may be any physical medium containing or storing programs which can be used by a command execution system, apparatus or element or the incorporation thereof. In the present disclosure, the computer readable signal medium may include data signal in the base band or propagating as parts of a carrier in which computer readable program codes are carried. The propagated signal may take various forms, include but is not limited to: an electromagnetic signal, an optical signal or a combination thereof. The signal medium that can be read by computer may be any computer readable medium except for the computer readable storage medium. The computer readable medium is capable of transmitting, propagating or transferring programs for used by or used in combination with a command execution system, apparatus or element. The program codes contained on the computer readable medium may be transmitted with any suitable medium including but is not limited to: a wireless medium, a wired medium, an optical cable medium, a RF medium and the like, or any combination thereof.

The flowcharts and block diagrams in the figures illustrate architectures, functions and operations that may be implemented according to the system, the method and the computer program product of the various embodiments. In this regard, each block in the flow charts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units or modules involved in the embodiments of the present application may be implemented by way of software or hardware. The described units or modules may also be provided in a processor, for example, described as: a processor, comprising a point cloud data frame sequence building unit, a morphological data extracting unit, a spatial position relation establishing unit and a map constructing unit, where the names of these units or modules are not considered as a limitation to the units or modules. For example, the map constructing unit may also be described as "a unit for constructing a map."

In another aspect, the present application further provides a non-volatile computer storage medium. The non-volatile computer storage medium may be the non-volatile computer storage medium included in the apparatus in the above embodiments, or a stand-alone non-volatile computer storage medium which has not been assembled into the apparatus. The non-volatile computer storage medium stores one or more programs. The one or more programs, when executed by a device, cause the device to: building a point cloud data frame sequence using point cloud data frames acquired in real time, the point cloud data frame sequence including a plurality of point cloud data frames arranged in an order of acquisition time, adjacent point cloud data frames being generated after a set time, the point cloud data frames including point cloud data arranged in a matrix, the point cloud data including three-dimensional coordinates of a spatial position for marking an object; extracting morphological data from the point cloud data frames, the morphological data used for characterizing a morphological feature of a surface of the object and a morphological feature of a line of the object, including surface point cloud data corresponding to the surface of the object and/or line point cloud data corresponding to the line of the object; establishing a spatial position relation between morphological data of two adjacent point cloud data frames in the point cloud data frame sequence; and determining a reference spatial position relation corresponding to a stationary object based on the spatial position relation, and constructing a map with the reference spatial position relation.

The foregoing is a description of some embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concepts of the disclosure, such as, technical solutions formed by replacing the features as disclosed in the present application with (but not limited to), technical features with similar functions.

What is claimed is:

1. A method for constructing a map, comprising:
building a point cloud data frame sequence using point cloud data frames acquired in real time, the point cloud data frame sequence including a plurality of point cloud data frames arranged in an order of acquisition time, adjacent point cloud data frames being generated after a set time, the point cloud data frames including point cloud data arranged in a matrix, the point cloud data including three-dimensional coordinates of a spatial position for marking an object in a surrounding environment of an unmanned vehicle;
extracting morphological data from the point cloud data frames, the morphological data used for characterizing a morphological feature of a surface of the object and a morphological feature of a line of the object, including surface point cloud data corresponding to the surface of the object and/or line point cloud data corresponding to the line of the object;
establishing a spatial position relation between morphological data of two adjacent point cloud data frames in the point cloud data frame sequence, the spatial position relation being indicative of motion of the unmanned vehicle; and
determining a reference spatial position relation corresponding to a stationary object based on the spatial position relation, and constructing a map of the surrounding environment based on the reference spatial position relation.

2. The method according to claim 1, wherein the extracting morphological data from the point cloud data frames comprises:
determining a plurality of vectors between each point cloud data and an adjacent point cloud data in the point cloud data frames; and
assigning, when a vector satisfies a distance threshold condition and an angle threshold condition, two point cloud data corresponding to the vector as the morphological data.

3. The method according to claim 1, wherein the establishing a spatial position relation between morphological data of two adjacent point cloud data frames in the point cloud data frame sequence comprises:
determining two sets of morphological data corresponding to a given object in the two adjacent point cloud data frames; and
calculating a distance and an angle between the two sets of morphological data to obtain the spatial position relation.

4. The method according to claim 1, wherein the determining a reference spatial position relation corresponding to a stationary object based on the spatial position relation comprises:
counting a velocity of each object in two adjacent point cloud data frames to obtain a velocity profile, the velocity being determined by the spatial position relation and the set time; and
determining an object corresponding to a velocity having a largest ratio from the velocity profile as a stationary object, and determining a spatial position relation of the stationary object as the reference spatial position relation.

5. The method according to claim 1, wherein the constructing a map with the reference spatial position relation comprises:
plotting the stationary object in the world coordinate system based on morphological data corresponding to the reference spatial position relation to obtain a map corresponding to the point cloud data frame sequence.

6. An apparatus for constructing a map, comprising:
   at least one processor; and
   a memory storing instructions, which when executed by the at least one processor, cause the at least one processor to perform operations, the operations comprising:
   building a point cloud data frame sequence using point cloud data frames acquired in real time, the point cloud data frame sequence including a plurality of point cloud data frames arranged in an order of acquisition time, adjacent point cloud data frames being generated after a set time, the point cloud data frames including point cloud data arranged in a matrix, the point cloud data including three-dimensional coordinates of a spatial position for marking an object in a surrounding environment of an unmanned vehicle;
   extracting morphological data from the point cloud data frames, the morphological data used for characterizing a morphological feature of a surface of the object and a morphological feature of a line of the object, including surface point cloud data corresponding to the surface of the object and/or line point cloud data corresponding to the line of the object;
   establishing a spatial position relation between morphological data of two adjacent point cloud data frames in the point cloud data frame sequence, the spatial position relation being indicative of motion of the unmanned vehicle; and
   determining a reference spatial position relation corresponding to a stationary object based on the spatial position relation, and constructing a map of the surrounding environment based on the reference spatial position relation.

7. The apparatus according to claim 6, wherein the extracting morphological data from the point cloud data frames comprises:
   determining a plurality of vectors between each point cloud data and an adjacent point cloud data in the point cloud data frames; and
   assigning, when a vector satisfies a distance threshold condition and an angle threshold condition, two point cloud data corresponding to the vector as the morphological data.

8. The apparatus according to claim 6, wherein the establishing a spatial position relation between morphological data of two adjacent point cloud data frames in the point cloud data frame sequence comprises:
   determining two sets of morphological data corresponding to a given object in the two adjacent point cloud data frames; and
   calculating a distance and an angle between the two sets of morphological data to obtain the spatial position relation.

9. The apparatus according to claim 6, wherein the determining a reference spatial position relation corresponding to a stationary object based on the spatial position relation comprises:
   counting a velocity of each object in the two adjacent point cloud data frames to obtain a velocity profile, the velocity being determined by the spatial position relation and the set time; and
   determining an object corresponding to a velocity having a largest ratio from the velocity profile as a stationary object, and determining a spatial position relation of the stationary object as the reference spatial position relation.

10. The apparatus according to claim 6, wherein the constructing a map with the reference spatial position relation comprises:
    plotting the stationary object in the world coordinate system based on morphological data corresponding to the reference spatial position relation to obtain a map corresponding to the point cloud data frame sequence.

11. A non-transitory computer readable storage medium storing a computer program, which when executed by one or more processors, causes the one or more processors to perform operations, the operations comprising:
    building a point cloud data frame sequence using point cloud data frames acquired in real time, the point cloud data frame sequence including a plurality of point cloud data frames arranged in an order of acquisition time, adjacent point cloud data frames being generated after a set time, the point cloud data frames including point cloud data arranged in a matrix, the point cloud data including three-dimensional coordinates of a spatial position for marking an object in a surrounding environment of an unmanned vehicle;
    extracting morphological data from the point cloud data frames, the morphological data used for characterizing a morphological feature of a surface of the object and a morphological feature of a line of the object, including surface point cloud data corresponding to the surface of the object and/or line point cloud data corresponding to the line of the object;
    establishing a spatial position relation between morphological data of two adjacent point cloud data frames in the point cloud data frame sequence, the spatial position relation being indicative of motion of the unmanned vehicle; and
    determining a reference spatial position relation corresponding to a stationary object based on the spatial position relation, and constructing a map of the surrounding environment based on the reference spatial position relation.

12. The non-transitory computer readable storage medium according to claim 11, wherein the extracting morphological data from the point cloud data frames comprises:
    determining a plurality of vectors between each point cloud data and an adjacent point cloud data in the point cloud data frames; and
    assigning, when a vector satisfies a distance threshold condition and an angle threshold condition, two point cloud data corresponding to the vector as the morphological data.

13. The non-transitory computer readable storage medium according to claim 11, wherein the establishing a spatial position relation between morphological data of two adjacent point cloud data frames in the point cloud data frame sequence comprises:
    determining two sets of morphological data corresponding to a given object in the two adjacent point cloud data frames; and
    calculating a distance and an angle between the two sets of morphological data to obtain the spatial position relation.

14. The non-transitory computer readable storage medium according to claim 11, wherein the determining a reference spatial position relation corresponding to a stationary object based on the spatial position relation comprises:

counting a velocity of each object in two adjacent point cloud data frames to obtain a velocity profile, the velocity being determined by the spatial position relation and the set time; and determining an object corresponding to a velocity having a largest ratio from the velocity profile as a stationary object, and determining a spatial position relation of the stationary object as the reference spatial position relation.

15. The non-transitory computer readable storage medium according to claim 11, wherein the constructing a map with the reference spatial position relation comprises:

plotting the stationary object in the world coordinate system based on morphological data corresponding to the reference spatial position relation to obtain a map corresponding to the point cloud data frame sequence.

* * * * *